Patented Oct. 1, 1946

2,408,620

UNITED STATES PATENT OFFICE 2,408,620

ARC WELDING ELECTRODES

Erwin Felix Friedlander, Hobart, Tasmania, Australia, assignor to O. & F. Company Proprietary Limited, Hobart, Tasmania, Australia, a company of Tasmania No Drawing. Application November 20, 1943, Serial No. 511,165. In Australia November 21, 1942

3 Claims. (Cl. 219—8)

This invention relates to flux coated arc welding electrodes, and more particularly to an improved heavy flux coated electrode for the electric arc welding or atomic hydrogen welding of chromium or chromium-nickel alloy steel such as austenitic stainless steels or the like.

It is a well known fact that when chromium or chromium and nickel are added to iron the alloys produced are highly resistant to oxidation and heat and are also resistant to chemicals such as nitric and other acids. The corrosion resisting properties are due to the chromium and, in order to be effective, the chromium must be distributed uniformly throughout the alloy or solution which means that its equilibrium must remain undisturbed.

So far as welding is concerned, practically the whole stainless steel field can be divided into two general classes; those containing only chromium as an alloying element regardless of the amount, and the austenitic chromium-nickel group containing both chromium and nickel in varying proportions. The possible combinations of chromium and nickel in such alloys are very great.

Electrodes at present used for the welding of such chromium and chromium-nickel alloy steels have a bare alloy welding rod or wire core substantially equivalent to the base metal to be welded. Thus, the alloy wire core of an electrode commonly employed for the welding of chromium-nickel steel of 18% chromium and 8% nickel is of similar analysis.

This practice requires a wide variety of bare alloy rods, usually more than seventy, of different analysis for all kinds of chromium or chromium-nickel steels ranging from stainless steel of low carbon and 4–40% chromium content to austenitic chromium-nickel steels and those containing a small percentage of, for instance, titanium, columbium, tungsten or the like in addition to chromium and nickel.

This is costly and, in addition, the production of austenitic stainless steel for such electrodes is difficult because the hot rolled wire is hard and a costly complicated treatment is necessary to soften it. Most specifications of alloy wire cores have a low carbon content. Such stainless steels are mostly produced from the expensive low carbon ferro-chrome, while the drawing of the wire from ingots is only possible under very difficult manufacturing conditions owing to the work hardening properties of some austenitic stainless steels.

The quality of a chromium or chromium-nickel steel weld depends to a large extent upon the influence of elements or compounds used in a coating on the electrode because the molten alloy metal has to be protected from contact with the atmosphere, particularly to prevent the oxidation of the important metal chromium. In addition to protecting the metal, the coating may also have a stabilizing effect to assist in maintaining a steady arc between the parent metal to be welded and the electrode.

Although chromium-nickel alloys are excellent material for welding and under satisfactory welding conditions produce strong, tough and reasonably ductile welds, they possess several characteristics, the nature of which must be well understood and provided for before welding of any kind is attempted. The principal of these is the forming of carbide precipitation which occurs often particularly when the carbon content of the alloy core wire of the electrode is high. When 18/8 stainless steel containing more than .08% carbon is heated to between 1000 and 1500° F., the carbon is precipitated or segregated out of solution and deposited along the grain boundaries in the form of carbides. These carbide infected zones are less resistant to corrosion than the parent metal with a result that wherever carbides are present, greater attack will occur when exposed to corrosive conditions. This tendency compels the electrode manufacturer to use either stainless steel material with very low carbon content of .08% or under, or to add to the stainless steel electrode or wire columbium or other reducing elements, to permit safe welding with higher carbon content.

In arc welding with chromium-nickel alloy wire, it must also be remembered that the electrical resistance is considerably higher and the melting point lower than that of mild steel and therefore the necessary welding current must be somewhat lower to prevent the alloy welding electrode from becoming too hot or even plastic. For this reason, the use of high current and long electrodes must be avoided. As a rule, the length of the electrode should be kept within 8–14 inches depending on the size of the electrode. This results in a disadvantageous waste of stainless steel wire and welding time.

In nearly all cases only direct current with reversed polarity is used for the arc welding of stainless steels.

These are some of the serious difficulties encountered in the use of stainless steel electrodes having alloy core wire.

After considerable research I have discovered that these difficulties can be overcome and improved results obtained by using as a core mild steel wire of low carbon content having less than .12% carbon, .4–.6% manganese and less than .04% each silicon, phosphorous and sulphur and fluxed under high pressure with a thick coating which incorporates all the necessary alloying ingredients to combine in the heat of the arc with the metal of the core wire and deposit a chromium or chromium-nickel alloy steel of the required analysis. The coating can also contain oxide reducing and gas and slag forming ingredients which, simultaneously with the deposit of the alloy metal, will produce a protective screen of gas and slag to protect the molten metal while it is passing through the arc and the deposit until the weld has solidified.

My research has further shown that a coating mixture having the correct quantities of alloying and slag forming ingredients does not form an absolutely homogeneous weld deposit of stainless steel or chromium-nickel alloy steel unless the alloying ingredients embodied in the coating are uniformly distributed within the coating and true concentricity of the coating on the mild steel wire core obtained. Otherwise, a weld of varying properties and analysis results.

Any eccentricity of the coating causes oblique burning of the end of the electrode during welding. One side of the wire core burns down quicker than the other forming an overlap and creating a longer arc than is suitable or necessary which, in turn, influences the quality of the weld deposit and the clear flow of the molten metal and results in inclusion of slag.

I have discovered that the necessary heavy, homogeneous and concentric coating can only be applied to the wire core by extruding from a plastic dry mass or mixture under very high pressure, preferably of a minimum of 400 lbs. per square inch. The dry plastic mass does not permit of any de-composition of the ingredients and is prepared by mixing the alloying and slag forming ingredients in finely ground form with a binding agent, such as for instance sodium silicate of 40–50 Beaumé, to form a suitable consistency for extrusion under the high pressure.

I have also discovered from my research that the outside diameter of the coating must be not less than 1.5 times the diameter of the core wire. Preferably, it is between 1.5 and twice the diameter of the core wire, i. e. for a 3.25 mm. wire between 4.875 and 6.5 mm. This thickness of coating is found necessary in order to obtain satisfactory burning of the electrode and the inclusion of sufficient ingredients to balance the alloy content of the chromium-nickel alloy weld.

The improved electrode as described has the advantage that it enables any desired variation of chromium and nickel to be obtained in the weld deposit solely by variation of the composition and thickness of the coating. Another advantage of the electrode is that, on account of the heavy coating, the weld deposit will be from 20–50% heavier for the same gauge of wire than that obtained with the previous electrodes having an alloy steel wire core.

Generally the coating may be varied within the following limits: 15–30% nickel, 20–60% chromium, 4–10% ferro-silicon, 3–8% ferromolybdenum, 4–10% ferro-manganese with 40–50% of the usual gas and slag forming ingredients. The solid ingredients should preferably be ground to 100 mesh or more.

The coating can also contain reducing or stabilising elements, such as for instance, titanium, columbium or tantalum in sufficient quantities to eliminate any danger of intergranular corrosion but it is evident that, by using wire core of low carbon content, very often such reducing elements can be avoided because the solution will be sufficiently free from any disturbance in the equilibrium.

One suitable electrode according to the invention given by way of example consists of core wire of the following composition:

|  | Per cent |
|---|---|
| Carbon | .09 |
| Manganese | .45 |
| Silicon | .03 |
| Phosphorus maximum | .04 |
| Sulphur do | .04 |
| Iron | remainder |

The heavy coating is of a thickness 1.85 times the diameter of the core wire and consists of the following:

|  | Per cent by weight |
|---|---|
| Nickel powder | 14 |
| Chromium | 27.6 |
| Ferro-molybdenum | 4.4 |
| Ferro-manganese | 4 |
| Ferro-titanium | 6 |
| Gas forming and slag forming ingredients | 44 |

Weld deposits produced by this electrode will be found to have the following analysis:

|  | Per cent |
|---|---|
| C | .06– .08 |
| Ni | 10.3 –10.6 |
| Cr | 18 –18.5 |
| Mo | 2.5 – 2.75 |
| Mn | 1.2 – 1.8 |
| Si | .5 – 1 |

The tensile strength of the deposit is from 38–40 tons per square inch with an elongation of 35–45% and izod impact of 63–75 foot/lbs., while the corrosion resistance will be equal to any 18/8%/Mo stainless steel.

With the improved electrode it is possible to use either alternating or direct current and a further simplification in the welding technique is obtained as it is usually possible to touch the parent metal or work-piece without freezing. This allows the shortest possible arc, steady welding conditions and easy handling of the electrode. The electrode burns in crater form, the edges of which only touch the parent metal and act as an insulator, automatically maintaining a short arc, while the wire core and coating ingredients are shielded from atmospheric oxygen and nitrogen. In this way the best conditions are established to prevent loss of chromium.

As the electrical resistance of the mild steel core wire is low, the danger that the electrode core should become hot is eliminated and therefore it is possible to use electrodes in any standard length and at the same time to use any reasonable electric current, resulting in good penetration, and quick welding. The mild steel core also secures a high fluidity of the metal owing to the increased current so that it flows smoothly and uniformly with a higher rate of speed.

The most important advantage, however, is the elimination of the complicated process of manufacturing stainless steel core wire and the range of such core wires of different analysis previously necessary in welding stainless steels. Such elimination results in substantial economy in the welding of stainless steels.

It will thus be appreciated from the foregoing that the use of the improved electrode will greatly simplify the process of welding austenitic stainless steel of any analysis and also improve the welds obtained. It also renders possible the automatic welding of stainless steels.

What I claim is:

1. An arc welding electrode for welding chromium or austenitic chromium-nickel alloy steels, such as stainless steels and the like, comprising a core wire of steel of low carbon content having a heavy coating of a diameter at least 1.5 times the diameter of the core wire containing 15–30% nickel, 20–60% chromium, 4–10% ferro-silicon, 4–10% ferro-manganese and 3–8% ferro-molybdenum with gas forming and slag forming ingredients, the nickel and chromium combining under the heat of the arc with the metal of the core wire to deposit a chromium-nickel alloy steel and the slag forming ingredients simultaneously producing a slag which protects the molten metal while it is passing through the arc and covers the deposit until the weld has solidified.

2. An arc welding electrode for welding as claimed in claim 1 wherein the alloying and slag forming ingredients are in dry-mixture finely ground binder united form and united with the core wire by extrusion under high pressure.

3. An arc welding electrode for the welding of austenitic chromium-nickel steel comprising a core wire of low carbon content having less than .12% carbon, .4–.6% manganese and less than .04% each silicon, phosphorus and sulphur and having a coating of a diameter at least 1.5 times the diameter of the core wire extruded from a plastic dry mass, the coating embodying 40–50% slag and gas forming elements and also in powder form 20–60% chromium, 15–30% nickel, 4–10% ferro-silicon, 4–10% ferro-manganese, 3–8% ferro-molybdenum to combine in the heat of the arc with the metal of the core wire to produce an 18/8 austenitic chromium-nickel steel deposit while the gas and slag forming ingredients simultaneously produce a protective screen to protect the molten metal while it is passing through the arc and the weld deposit until the weld has solidified.

ERWIN FELIX FRIEDLANDER.